United States Patent
Tsirkin et al.

(10) Patent No.: US 10,157,146 B2
(45) Date of Patent: Dec. 18, 2018

(54) LOCAL ACCESS DMA WITH SHARED MEMORY POOL

(71) Applicant: Red Hat Israel, Ltd., Raanana (IL)

(72) Inventors: Michael Tsirkin, Yokneam Illit (IL); Marcel Apfelbaum, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 258 days.

(21) Appl. No.: 14/620,906

(22) Filed: Feb. 12, 2015

(65) Prior Publication Data

US 2016/0239430 A1   Aug. 18, 2016

(51) Int. Cl.
*G06F 12/109* (2016.01)
*G06F 9/455* (2018.01)

(52) U.S. Cl.
CPC ........ *G06F 12/109* (2013.01); *G06F 9/45558* (2013.01); *G06F 2009/45583* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 7,596,654 B1 | 9/2009 | Wong | |
| 8,065,687 B2 | 11/2011 | Purtell, II et al. | |
| 8,504,691 B1 * | 8/2013 | Tobler | H04L 67/02 370/229 |
| 8,544,004 B2 | 9/2013 | Fultheim et al. | |
| 2006/0095690 A1 * | 5/2006 | Craddock | G06F 12/1475 711/153 |
| 2009/0210888 A1 | 8/2009 | Lee et al. | |
| 2012/0072906 A1 * | 3/2012 | Tsirkin | G06F 12/1009 718/1 |
| 2012/0278803 A1 | 11/2012 | Pavlov | |
| 2013/0067193 A1 * | 3/2013 | Kagan | G06F 12/1081 711/206 |
| 2013/0332677 A1 | 12/2013 | Fitzpatrick et al. | |
| 2013/0332696 A1 | 12/2013 | Schmidt et al. | |
| 2014/0201451 A1 | 7/2014 | Dube et al. | |

(Continued)

OTHER PUBLICATIONS

Huang et al., "High Performance Virtual Machine Migration with RDMA over Modern Interconnects," Downloaded Dec. 30, 3014, Computer Science and Engineering, The Ohio State University, 2015 Neil Avenue, Columbus, OH 43210, USA ; IBM T. J. Watson Research Center, 19 Skyline Drive, Hawthorne, NY 10532, USA, http://mvapich.cse.ohio-state.edu/static/media/publications/abstract/huang-cluster07.pdf.

(Continued)

*Primary Examiner* — Wynuel S Aquino
(74) *Attorney, Agent, or Firm* — Lowenstein Sandler LLP

(57) ABSTRACT

A processing device receives a first request from a virtual machine to register a memory region to a hardware device. The processing device generates a first key for the memory region, wherein the memory region is not registered to the hardware device. The processing device generates a second key for a shared memory pool that is pinned and registered to the hardware device. The processing device generates a mapping of the first key to the second key. The processing device sends a response to the virtual machine that the memory region has been registered to the hardware device, the notification comprising the first key.

20 Claims, 8 Drawing Sheets

(56) References Cited

U.S. PATENT DOCUMENTS

| | | | | |
|---|---|---|---|---|
| 2014/0282501 A1* | 9/2014 | Zeng | ................... | G06F 9/45545 |
| | | | | 718/1 |
| 2015/0220481 A1* | 8/2015 | Tanimoto | .......... | G06F 15/17331 |
| | | | | 711/128 |
| 2015/0263887 A1* | 9/2015 | Sajeepa | ................ | H04L 47/722 |
| | | | | 709/220 |

OTHER PUBLICATIONS

Novich et al., "Red Hat Enterprise Linux 7 Virtualization Deployment and Administration Guide," Published 2014, Red Hat Engineering Content Services, https://access.redhat.com/documentation/en-US/Red_Hat_Enterprise_Linux/7/pdf/Virtualization_Deployment_and_Administration_Guide/Red_Hat_Enterprise_Linux-7-Virtualization_Deployment_and_Administration_Guide-en-US.pdf.

* cited by examiner

LOCAL ACCESS DMA WITH SHARED MEMORY POOL

TECHNICAL FIELD

Embodiments of the present invention relate to direct memory access (DMA) and, more specifically, to providing DMA in a virtualization environment while concurrently providing memory overcommitment.

BACKGROUND

Remote direct memory access (RDMA) is a direct memory access from the memory of one computer to the memory of another computer that takes place without consuming resources of the operating system of either computer. RDMA is low latency and high throughput. However, memory that is used for RDMA must be pinned. RDMA is compatible with virtualization. However, if virtualization is performed, a host generally does not know which portions of guest memory will be accessed via RDMA. Accordingly, the host pins all of the guest memory to physical memory. This can negate the advantages of memory overcommitment that are ordinarily realized through virtualization. For example, one of the drawbacks of the Infiniband® protocol (which uses RDMA) with regards to virtualization is that if Infiniband is used to perform RDMA in a virtualization environment, memory overcommitment is disabled.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
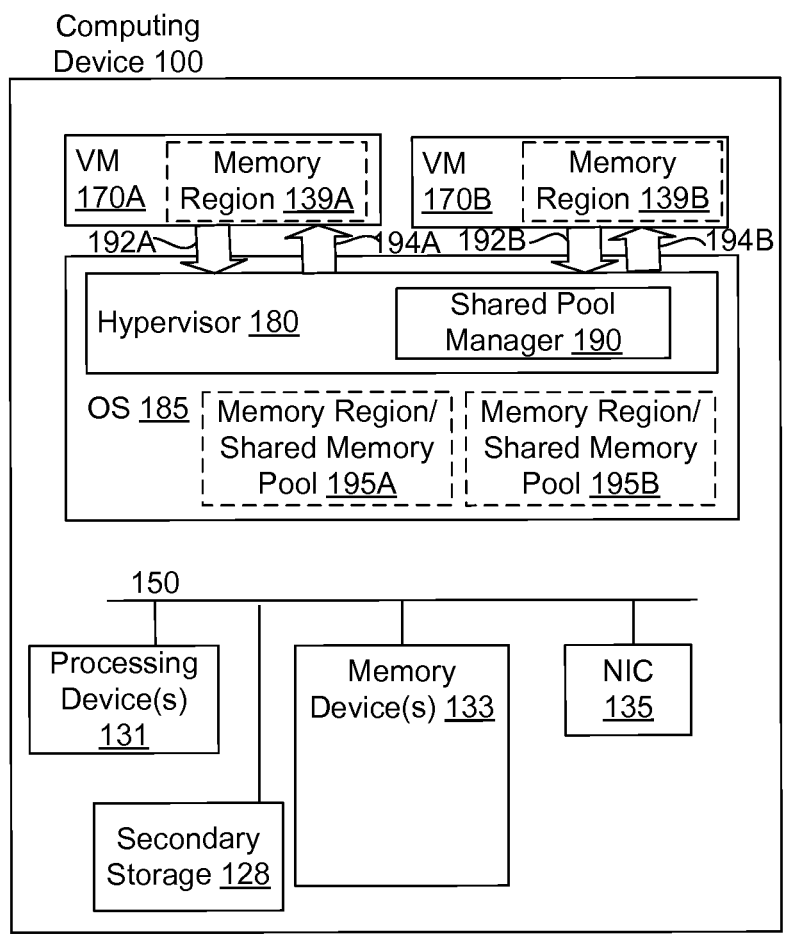
FIG. 1 is a block diagram that illustrates an embodiment of a computing device that hosts one or more virtual machines.

Described herein are a method and system for performing DMA operations (e.g., RDMA operations) in a virtualization environment without disabling memory overcommitment. Typically, if RDMA operations are to be performed in a virtualization environment, memory overcommitment is disabled. However, embodiments introduce a shared memory pool that is used for DMA operations on data in memory regions controlled by virtual machines. When an operation (e.g., a send or receive operation) that will result in a DMA operation is requested for a memory location by a virtual machine, the contents of that memory location are copied to the shared memory pool, and a hardware device such as a network interface controller (NIC) may then access that shared memory pool using DMA.

In embodiments, a guest operating system of a virtual machine requests to register a memory region of the virtual machine to a hardware device such as a NIC. Such registration of the memory region is a request to create a direct memory access (DMA) memory region, and typically involves pinning the entire memory of the virtual machine to physical memory so that the entire memory may be accessed through DMA by hardware devices. However, in embodiments a hypervisor intercepts such a memory registration request. The hypervisor then creates a first key for the memory region of the virtual machine and a second key for the shared memory pool and returns the first key to the virtual machine (e.g., to the guest OS in the virtual machine) along with a registration complete message. Accordingly, the VM is informed that the memory region has been registered to the hardware device though the memory region actually has not been registered.

A guest application or the guest OS in the virtual machine may then request a send or receive operation which will result in a DMA operation be performed on a location (e.g., one or more memory pages) in the memory region. Responsive to such a request, the hypervisor copies the data from the location to another location in the shared memory pool. The hypervisor modifies the request and then forwards the modified request on to a hardware device to which the request was directed. The hardware device may then perform a DMA operation on the other location in the shared memory pool. Thus, the virtual machine is able to perform DMA operations (e.g., RDMA operations) without the entire memory region of the virtual machine being pinned to physical memory (e.g., every memory page in the memory region being pinned). This enables RDMA operations (and other DMA operations) to be performed in a virtualization environment while at the same time enabling memory overcommitment.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring embodiments of the present invention.

Embodiments are described herein with reference to operations that facilitate DMA read operations and DMA write operations that are performed to satisfy receive requests to receive data from remote devices (e.g., over a network) and send requests to send data to remote devices. However, it should be understood that the same or similar operations described in embodiments may be performed for data transfers to or from a different virtual machine on the same host. Additionally, it should be understood that the same or similar operations described in embodiments may be performed for data transfers to or from different applications running in the same operating system and/or in the same virtual machine.

FIG. 1 is a block diagram that illustrates an embodiment of a computing device 100 (e.g., a host machine) that hosts one or more virtual machines (VMs) 170A-170B. The computing device 100 may be a rackmount server, a workstation, a desktop computer, a notebook computer, a tablet computer, a mobile phone, a palm-sized computing device, a personal digital assistant (PDA), etc. The computing device 100 includes host hardware, which may include one or more processing devices 131, physical memory (also referred to as memory devices) 133, secondary storage 128, one or more network interface controllers 135 (NICs, also referred to as network interface cards), and other hardware components (e.g., I/O devices).

Processing device 131 represents one or more general-purpose processing devices such as a microprocessor, central processing unit, or the like. More particularly, the processing device 131 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 131 may also be one or more special-purpose processing devices such as an application specific integrated circuit (ASIC), a field programmable gate array (FPGA), a digital signal processor (DSP), network processor, or the like. The memory device 133 may include volatile memory devices (e.g., random access memory (RAM)), non-volatile memory devices (e.g., Flash memory, read only memory (ROM), etc.), and/or other types of memory devices. The secondary storage 128 may include mass storage devices, such as magnetic or optical storage based disks, tapes and/or hard drives. NIC 130 is a device capable of implementing a physical layer and data link layer standard (such as Ethernet or InfiniBand).

The processing devices 131 may be communicatively coupled to memory device 133 and NIC 135 by one or more local buses 150 of a suitable architecture (e.g., peripheral component interconnect (PCI), peripheral component interconnect express (PCIe), and so on). The host hardware may also be coupled to external storage (not shown) via a direct connection or a local network. The computing device 100 may be a single machine or multiple host machines arranged in a cluster.

Computing device 100 executes an operating system (OS) 185. The operating system 185 manages the host hardware as well as software resources, and provides services for applications such as virtual machines 170A-170B.

In an illustrative example, as schematically illustrated by FIG. 1, computing device 100 may run multiple virtual machines (VMs) 170A-170B by executing a software layer between the hardware and the virtual machines. The software layer is a hypervisor 180, also known as a virtual machine monitor (VMM). In certain implementations, hypervisor 180 may be a component of operating system 185 executed by computing device 100. Alternatively, hypervisor 180 may be provided by an application running under host operating system 185, or may run directly on the computing device 100 without an operating system beneath it. Hypervisor 180 may abstract the physical layer, including processors, memory, and I/O devices, and present this abstraction to virtual machines 170A-170B as virtual devices, including virtual processors, virtual memory, and virtual I/O devices. In another illustrative example, computing device 100, instead of executing virtual machines 170A-170B, may run one or more non-virtualized applications on operating system 185.

Computing device 100 hosts any number of virtual machines (VM) 170A-170B (e.g., a single VM, one hundred VMs, etc.). A virtual machine is a combination of guest software that uses an underlying emulation of the host machine (e.g., as provided by hypervisor 180). The guest software may include a guest operating system, guest applications, guest device drivers, etc. Virtual machines 170A-170B can be, for example, hardware emulation, full virtualization, para-virtualization, and operating system-level virtualization virtual machines. The virtual machines may have the same or different guest operating systems, such as Microsoft® Windows®, Linux®, Solaris®, etc.

OS 185 may include a memory manager (not shown) that implements a virtual memory system where pages of an address space of a process or a virtual machine are mapped to physical memory. The address space virtualization may be handled through the processing device's paging mechanism. Paging may support a virtual memory environment where a large linear address space is simulated with a smaller amount of physical memory (e.g., random access memory (RAM)) and some disk storage (swap space). Each memory segment may be divided into pages of a defined size (e.g., 4 KB) which may be stored either in physical memory or on the disk. The memory manager may maintain a page directory and a set of page tables to keep track of the pages. When a process attempts to access an address location in the linear address space, the processing device 131 and/or the memory manager may use the page directory and page tables to translate the linear address into a physical address. If the page being accessed by a thread is not currently in physical memory, the processing device may generate a page fault exception, and the operating system 185 may then read the page from the disk and continue executing the thread.

The memory manager is responsible for managing the allocation of memory (e.g., physical memory and/or virtual memory) for the operating system 185, for virtual machines 170A-170B, for traditional applications running on operating system 185, and for hardware devices (e.g., NIC 135). The memory manager may perform operations such as allocating memory, mapping physical memory locations (e.g., physical memory pages) to virtual memory locations (e.g., virtual memory pages), freeing up unused memory locations (e.g., performing garbage collection on unused memory pages), and so on. The memory manager may manage physical memory and virtual memory to implement memory overcommitment (also referred to as memory overcommit), effectively increasing the amount of available memory through the use of paging (or swapping) some memory to secondary storage 128. Each virtual machine 170A-170B may have its own virtual memory space of contiguous virtual memory addresses. Each virtual memory address maps to a physical address either in physical memory (memory device 133) or in a swap space in secondary storage 128. In one embodiment, a guest operating system (OS) has a guest virtual address (GVA) that maps to a guest physical address (GPA) that the guest OS views as a physical memory address. However, the guest physical address is not an actual physical address. The hypervisor maps the GPA to a host virtual address (HVA), and further maps the HVA to a host physical address (HPA), where the HPA is the actual physical address in a memory device.

In certain implementations, computing device 100 supports DMA operations (e.g., RDMA operations used by Infiniband) associated with VMs 170A-170B without disabling overcommitment. The memory manager in some instances grants direct memory access (DMA) of physical memory locations to hardware devices (e.g., to NICs 135, secondary storage 128, graphics cards, sound cards, other physical memory, processing devices, etc.). DMA enables a hardware device to access physical memory (e.g., of memory device 133) independently of processing device 131. Without DMA, the processing device 131 is typically utilized for reading to or writing from a memory location in physical memory until the read or write is complete, and thus is unable to perform other operations during this time. In contrast, the use of DMA enables the processing device 131 to initiate the read or write operation, and let the hardware device communicate directly with the physical memory location for the duration of the read or write process. The processing device 131 may then perform other operations while the read or write is being performed. Once the hardware device completes the read or write operation, an interrupt or other message may be issued to notify the processing device that the read or write operation is complete. The use of DMA may significantly reduce the processor overhead associated with transferring data in and out of memory device 133.

As illustrated, each virtual machine 170A-170B includes a memory region 139A-139B, which is a virtual memory region that may be registered for RDMA. In some embodiments, guests in the virtual machines 170A-170B may use guest physical memory that is emulated by the hypervisor and mapped by the hypervisor into host virtual memory.

Hypervisor 180 includes a shared pool manager 190. Shared pool manager 190 manages a shared memory pool for local access DMA operations. Shared pool manager 190 may be a component of the hypervisor 180 (as shown), or may be separate from the hypervisor. In order to enable certain DMA operations, such as RDMA read and RDMA write operations, the virtual machines 170A-170B issue memory registration requests 192A-192B. Each memory registration request is a request to create a direct memory access (DMA) memory region and/or provide access of the DMA memory region to a hardware device. Typically creation of such a DMA memory region includes pinning memory pages of a memory region 139A-139B to physical memory (e.g., memory device 133). Memory registration of a memory region to a hardware device also includes generating one or more keys for the memory region and/or providing such keys to the hardware device. These may include a local key (l_key) usable by local hardware devices to perform DMA of the memory region as well as a remote key (r_key) usable by remote devices to perform DMA of the memory region. The generated keys are mapped to the physical memory. Each key represents a memory region and security access rights to the memory region.

Responsive to receipt of a memory registration request 192A-192B to register the memory region for the hardware device (e.g., for NIC 135), shared pool manager 190 may perform a set of operations that enable DMA operations without actually registering the requested memory region. In one embodiment, shared pool manager 190 generates a virtual key (e.g., a virtual local key) for the requested memory region 139A-139B. The key is referred to as a virtual key because the key is not based on any actual physical memory (and is not mapped to any physical memory). In one embodiment, a virtual key includes a flag or tag (e.g., one or more bits) that identifies the virtual key as not being mapped to physical memory (e.g., as being a virtual key).

Shared pool manager 190 also generates an additional memory region 195A-195B responsive to the memory registration request 192A-192B. As illustrated, a separate additional memory region 195A-195B may be created for each virtual machine. Additionally, several memory regions may be created for the same virtual machine. The additional memory regions 195A-195B are each representations or instances of the same shared memory pool. Each additional memory region 195A-195B is in a protection domain of the respective virtual machine that it is associated with. This ensures that only that virtual machine is able to access data in the additional memory region created for that virtual machine. Alternatively, a single additional memory region controlled by the hypervisor may be created and used as the shared memory pool for some or all of the virtual machines. Shared pool manager 190 may additionally generate a mapping of the virtual keys for memory regions 139A-139B to the keys for memory regions 195A-195B. The mapping may be a table, list, file, data structure, etc.

Rather than the additional memory region 195A-195B being controlled by the virtual machine 170A-170B that issued the request, this memory region (shared memory pool) 195A-195B is controlled by the hypervisor 180 and/or OS 185. Shared pool manager 190 then registers the additional memory region (shared memory pool) 195A-195B that was created, including pinning the additional memory region 195A-195B and generating one or more keys for the additional memory region 195A-195B. In one embodiment, shared pool manager 190 pins the additional memory region 195A-195B (e.g., to a physical memory in the memory device 133). Each additional memory region 195A-195B may overlap the same shared memory pool and map to the same addresses of physical memory.

The hypervisor 180 (e.g., shared pool manager 190 of the hypervisor) may map the created virtual key(s) (e.g., for the memory region 139A) to the actual key(s) (e.g., for additional memory region 195A). Shared pool manager 190 may then return a memory registration success response to the requesting VM 170A-170B, the success response indicating that the memory region was registered with the hardware device. This response includes the virtual key that was created for the requested memory region 139A-139B.

Figure 2A:
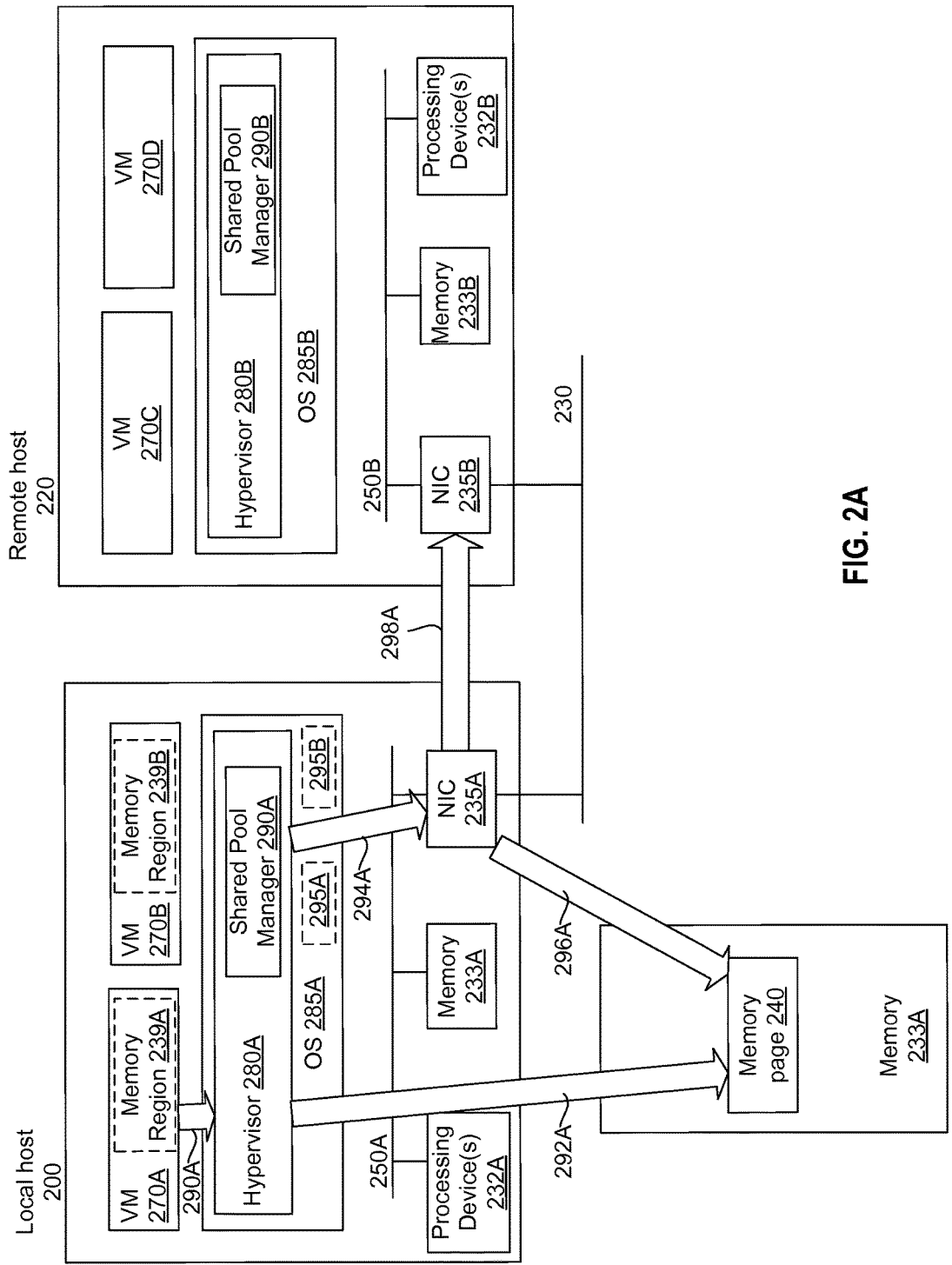
FIG. 2A is a block diagram that illustrates a send operation performed by a local host, in accordance with one embodiment.
Figure 2B:
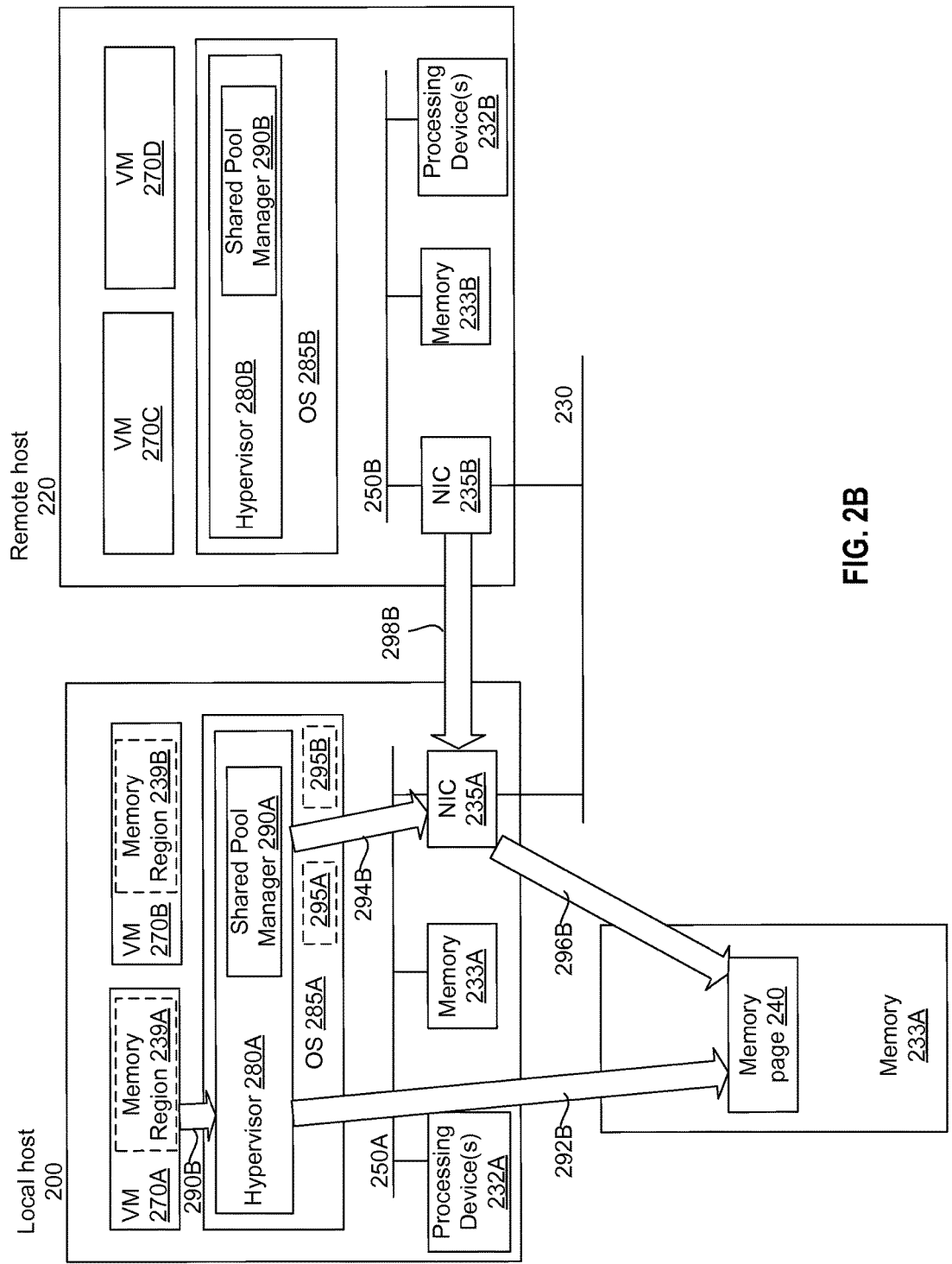
FIG. 2B is a block diagram that illustrates a receive operation performed by a local host, in accordance with one embodiment.

FIG. 2A is a block diagram that illustrates a send operation performed by a local host 200, in accordance with one embodiment. FIG. 2B is a block diagram that illustrates a receive operation performed by local host 200, in accordance with one embodiment. Local host 200 may be interconnected, via a network 230, with remote host 220. Local host 200 may comprise one or more processing devices 232A communicatively coupled to a memory device 233A and a network interface controller (NIC) 235A (or multiple NICs). Local connections within local host 200, including connections between processing device 232A, memory device 233A, and NIC 235A, may be provided by one or more local buses 250A of a suitable architecture.

Local host 200 may run an operating system 285A, a hypervisor 280A and multiple virtual machines (VMs) 270A-270B. In certain implementations, hypervisor 280A may be a component of operating system 285A executed by local host 200. Alternatively, hypervisor 280A may be provided by an application running under host operating system 285A, or may run directly on the local host 200 without an operating system beneath it.

Remote host 220 may be another host machine similar to local host 200. Remote host 220 may include a hardware layer including one or more processing devices 232B, one or more memory devices 233B, and a NIC 235B (or multiple NICs) connected via one or more local buses 250B. Remote host 220 may additionally include an operating system 285B, a hypervisor 280B hosting one or more virtual machines 270C-270D, and so on. Remote host 220 may be substantially similar to local host 200. Both local host 200 and remote host 220 may correspond to computing device 100 in embodiments.

Local host 200 and/or remote host 220 may include a shared pool manager 290A, 290B. In one embodiment, management of the shared pool and keys (e.g., RDMA keys) is managed by a hypervisor (e.g., by a shared pool manager of a hypervisor) and the operations of pinning memory pages and granting DMA access are performed by a memory manager of an operating system. Each VM 270A-270B on local host 200 has a memory region 239A-239B controlled by the respective VM 270A-270B. The OS 285A additionally includes a shared memory pool, which in one embodiment is memory region 295A that has been generated for VM 270A and memory region 295B that has been generated for VM 270B. Memory regions 295A-295B overlap the same shared memory pool. For example, each memory region 295A-295B may be the same size and map to the same physical memory addresses. Thus, the same shared memory pool may be shared by multiple virtual machines 170A-170B.

In certain implementations, local host 200 and/or remote host 220 may support both DMA operations (e.g., RDMA operations) and virtualization while maintaining memory overcommitment. In such an implementation, shared pool manager 290A or shared pool manager 290B may perform one or more operations to facilitate the DMA operations.

With regards to FIG. 2A, VM 270A may issue a send request 290A for NIC 235A to send data of a first location in the memory region 239A. The send request trigger an RDMA read request. The send request 290A may include a virtual key previously generated for the memory region 239A, a first memory address of the first location in the memory region 239A, and a length. The length may be the size of the data that is to be transmitted.

Hypervisor 280A may intercept the send request 290A. Hypervisor 280A (e.g., shared pool manager 290A of hypervisor) may then determine that the virtual key is not mapped to physical memory (e.g., is not a standard 1_Key). Such a determination may be made based on a flag or tag included in the virtual key. Alternatively, or additionally, shared pool manager 290A may maintain a list of virtual keys, and may compare received keys to the list. If a received key matches a key in the list, shared pool manager 290A may determine that the received key is a virtual key. Once shared pool manager 290A determines that the received key is a virtual key, shared pool manager may determine that the virtual key is associated with a key for memory region 295A. Alternatively, these operations may be performed together. In one embodiment, shared pool manager 290A maintains a mapping of virtual keys of memory regions 239A-239B to keys of the shared memory pool (e.g., to keys of memory regions 295A-295B). A single check of the mapping may both identify the received key as a virtual key and identify the actual key that the virtual key is associated with, for example.

Once hypevisor 280A (e.g., shared pool manager 290A of hypervisor 280A) determines the additional key is associated with the virtual key, shared pool manager replaces the virtual key in the second request with the additional key. Additionally, shared pool manager 290A allocates a second location of the shared memory pool (e.g., of memory region 295A) for the send request. The allocated second location may have a size appropriate to the length of the data that is to be transmitted. Shared pool manager 290A then accesses 292A memory device 233A to copy contents of the first memory location of memory region 239A to the second memory location (e.g., to a physical memory page 240). Shared pool manager 290A may additionally replace the first memory address of the first memory location in the memory region 239A with the second memory address for the second memory location in the shared memory pool (e.g., in memory region 295A).

Once the send request has been modified, hypervisor 280A provides 294A the modified send request to NIC 235A. The NIC 235A is then able to access the shared memory pool (memory region 295A) using the additional key. NIC 235A may then perform DMA to access 296A the data at the second location that is in the memory pages of the shared memory pool that are pinned to physical memory (e.g., may access memory page 240). NIC 235A then sends a transmission 298A of the data to NIC 235B of remote device 220. Once the transmission 298A is complete, shared pool manager 290A may deallocate the second location in the memory region 295A. The VM 270A or another VM 270B may then later reuse that same location in the shared memory pool for another DMA operation.

With regards to FIG. 2B, VM 270A may issue a receive request 290B for NIC 235A to receive data. The receive request may trigger an RDMA write request. The receive request 290B may include a virtual key previously generated for the memory region 239A, a first memory address of a first location in the memory region 239A to which data will be written, and a length. The length may be the maximum length of the data that is to be received.

Hypervisor 280A may receive or intercept the receive request 290B. Shared pool manager 290A may then determine that the virtual key is not mapped to physical memory (e.g., is not a standard 1_Key). Once shared pool manager 290A determines that the received key is a virtual key, shared pool manager may determine that the virtual key is associated with a key for the shared memory pool (e.g., for memory region 295A). Alternatively, these operations may be performed together.

Once shared pool manager 290A determines the additional key associated with the virtual key, shared pool manager replaces the virtual key in the second request with the additional key. Additionally, shared pool manager 290A allocates a second location of the shared memory pool (e.g., of memory region 295A) for the receive request. The allocated second location may have a size appropriate to the length of the data that is to be received. Shared pool manager 290A may additionally replace the first memory address of the first memory location in the memory region 239A with the second memory address for the second memory location in the memory region 295A.

Once the receive request has been modified, hypervisor 280A provides the modified receive request to NIC 235A. NIC 235A may then receive a transmission 298B of data from NIC 235B, and may perform DMA to write 296B the data to physical memory (e.g., memory page 240) mapped to the second location that is in the shared memory pool. Shared pool manager 290A may then access 292B the physical memory mapped to the second location in the shared memory pool to copy the contents of the second location in memory region 295A to the first location in memory region 239A. Eventually a notification will be issued indicating that the read request is complete. Shared pool manager 290A may then deallocate the second location in the shared memory pool. The VM 270A or another VM 270B may then later reuse that same location in the shared memory pool for another DMA operation.

Figure 3:
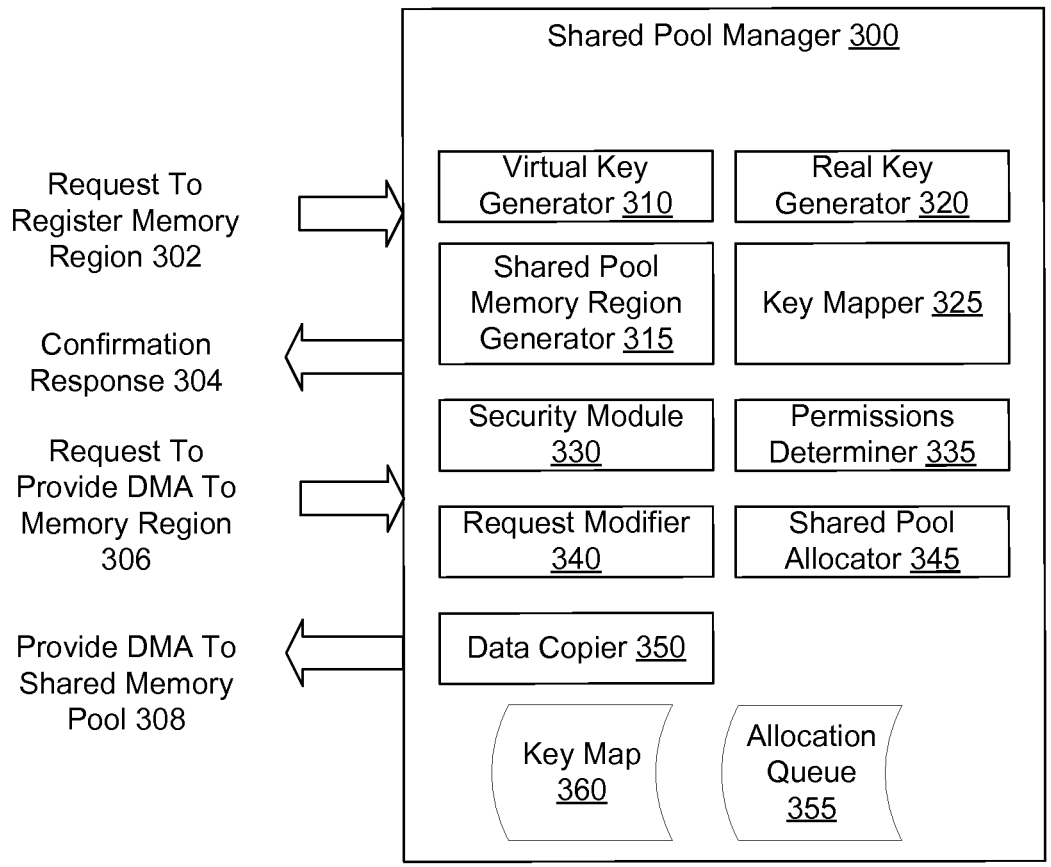
FIG. 3 is a block diagram that illustrates an embodiment of a memory manger.

FIG. 3 is a block diagram that illustrates an embodiment of a shared pool manger 300. Shared pool manager 300 may correspond to any of shared pool managers 190, 290A, 290B of FIGS. 1-2B in embodiments. In one embodiment, shared pool manager 300 includes a virtual key generator 310, a real key generator 320, a shared pool memory region generator 315, a key mapper 325, a security module 330, a permissions determiner 335, a request modifier 340, a shared pool allocator 345, and/or a data copier 350. Alternatively, the functionality of one or more of these modules may be combined into a single module or may be further divided into additional modules. Shared pool manager 300 may additionally maintain an allocation queue 355 and/or a key map 360.

In response to a memory registration request 302 from a virtual machine (e.g., a request to register a memory region with a NIC), virtual key generator 310 generates a virtual key for a memory region that the virtual machine requested be registered. Additionally, shared pool memory region generator 315 may generate a new memory region associated with the virtual machine but controlled by the shared pool manager 300 and perform memory registration for the new memory region (e.g, register the memory region to the NIC). The new memory region may be a shared memory pool shared by multiple virtual machines. For example, real key generator 320 may generate an additional key for the new memory region and the new memory region may be pinned to physical memory. Key mapper 325 may map the virtual key for the requested memory region to the actual key for the new memory region/shared memory pool. Key mapper may additionally record a mapping from the virtual key and/or the additional key to one or more guest physical addresses (GPAs) of the guest. The GPAs refer to what the guest in the virtual machine sees as physical memory. Such a mapping may later be used, for example, to perform a lookup to determine where in the memory region of the virtual machine to place data responsive to a receive request.

Shared pool manager 300 may send a confirmation response 304 to the virtual machine confirming that the requested memory registration has been performed. The confirmation response may be sent to the virtual machine even though the requested memory region was not actually registered with a requested hardware device such as a NIC.

In one embodiment, prior to virtual key generator 310, real key generator 320, shared pool memory region generator 315 and key mapper 325 performing the above described operations, permissions determiner 335 first determines the permissions associated with the received memory registration request 302. The memory registration request 302 may include no RDMA permissions, local RDMA permissions, and/or remote RDMS permissions. If remote access to the memory region is permitted (e.g., if remote RDMA permissions are enabled) in one embodiment, the above described operations are not performed. Instead, memory overcommitment is disabled, and the requested memory registration is performed. If remote access to the memory region is not permitted (e.g., if remote RDMA permissions are disabled), then the above operations may proceed as described.

After the virtual machine is notified that its memory region has been registered to the hardware device, the virtual machine may issue a request 306 for the hardware device to perform an operation (e.g., a send or receive operation) on the memory region. This may trigger a DMA request or operation such as a request for an RDMA write to the memory region or an RDMA read of the memory region.

Responsive to shared pool manager 300 receiving such a request 306, key mapper 325 may use a key map 360 to determine which memory region controlled by shared pool manager 300 has a key that maps to the key in the received request.

Security module 330 may check that the request satisfies one or more security policies. Each request may include a key, a memory location and/or a length. In one embodiment, security module 330 applies a key verification rule and checks the key associated with the request to determine whether the key matches any keys for the shared memory pool (e.g., for new memory regions controlled by the shared pool manager 300). Keys returned to the virtual machines are virtual keys, and should not match keys of the memory regions controlled by the shared pool manager 300. Accordingly, if any such key is received, security module 330 may return an error. If the received key does not match a key of a memory region controlled by shared pool manager 300 (e.g., does not match a real key for the shared memory pool), then security module 330 may determine that the request satisfies the key verification rule.

Each virtual machine on a host may have a unique (or several unique) protection domain (PD) for security and isolation from the other virtual machines. The protection domain is a descriptor that may isolate different processes (e.g., different RDMA processes). Received requests identify the protection domain of the requesting virtual machine. Each memory region controlled by the hypervisor (e.g., by a shared pool manager 300) may be for the same shared memory pool but include a protection domain of a particular virtual machine. Security module may apply a protection domain security rule to determine whether the virtual key in the request maps to a memory region of (version of the shared memory pool) with the same protection domain as the protection domain of the virtual machine. If the protection domains to not match, security module may return an error.

Shared pool allocator 345 determines a length or data size associated with the request, and allocates a portion of the shared pool for the request. The allocated portion may have the length or size indicated in the request. In one embodiment, shared pool allocator 345 allocates a portion of a memory region controlled by the shared pool manager 300 and associated with the virtual machine. The memory region may be a version of the shared memory pool associated with the virtual machine. If the request was a read request, data copier 350 writes contents of the virtual machine's memory region to the shared memory pool (e.g., to the memory region associated with the virtual machine).

Request modifier 340 modifies the received request by replacing the virtual key in the request with the key to the shared memory pool (e.g., to the memory region controlled by shared pool manager 300 that is associated with the virtual machine). Additionally, request modifier 340 replaces the memory address for a first location of the virtual machine's memory region included in the request with a second location of the shared memory pool. Shared pool manager 300 may then provide the modified request to the hardware device. By sending the modified request to the hardware device, shared pool manager is providing DMA to the shared memory pool 308.

In some instances, when a request that would trigger DMA to a memory region is received there may be insufficient available space in the shared memory pool to satisfy the request. In one embodiment, shared pool manager 300 performs a check on the shared memory pool responsive to a request to provide DMA access to a virtual machine's memory region. If there is sufficient available space in the shared memory pool, the above described operations are performed. However, if there is not sufficient available space, the request may be added to an allocation queue 355. The allocation queue 355 may be maintained by the shared pool manager 300, a hypervisor, an operating system, or a virtual machine. When space in the shared memory pool frees up, shared pool manager 300 allocates that space for the first entry in the allocation queue 355, removes an entry from the pool, and moves the other entries up in the queue. Once a particular received request reaches the front of the allocation queue 355 and there is sufficient space available in the shared memory pool, the above described operations are performed to satisfy the request and the entry for that request is removed from the pool.

Figure 4:
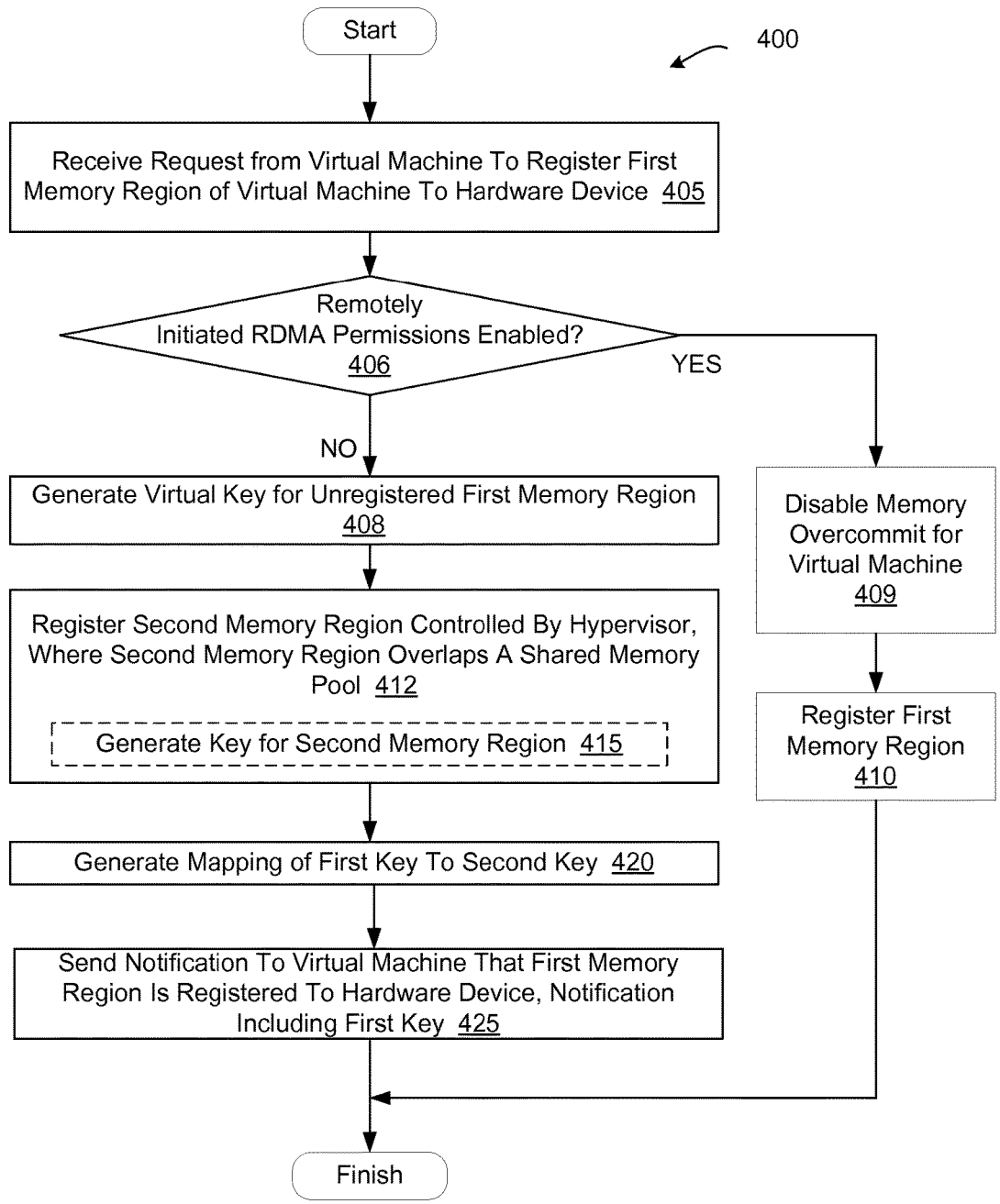
FIG. 4 is a flow diagram illustrating one embodiment of a method for setting up a shared memory pool for DMA operations.
Figure 5:
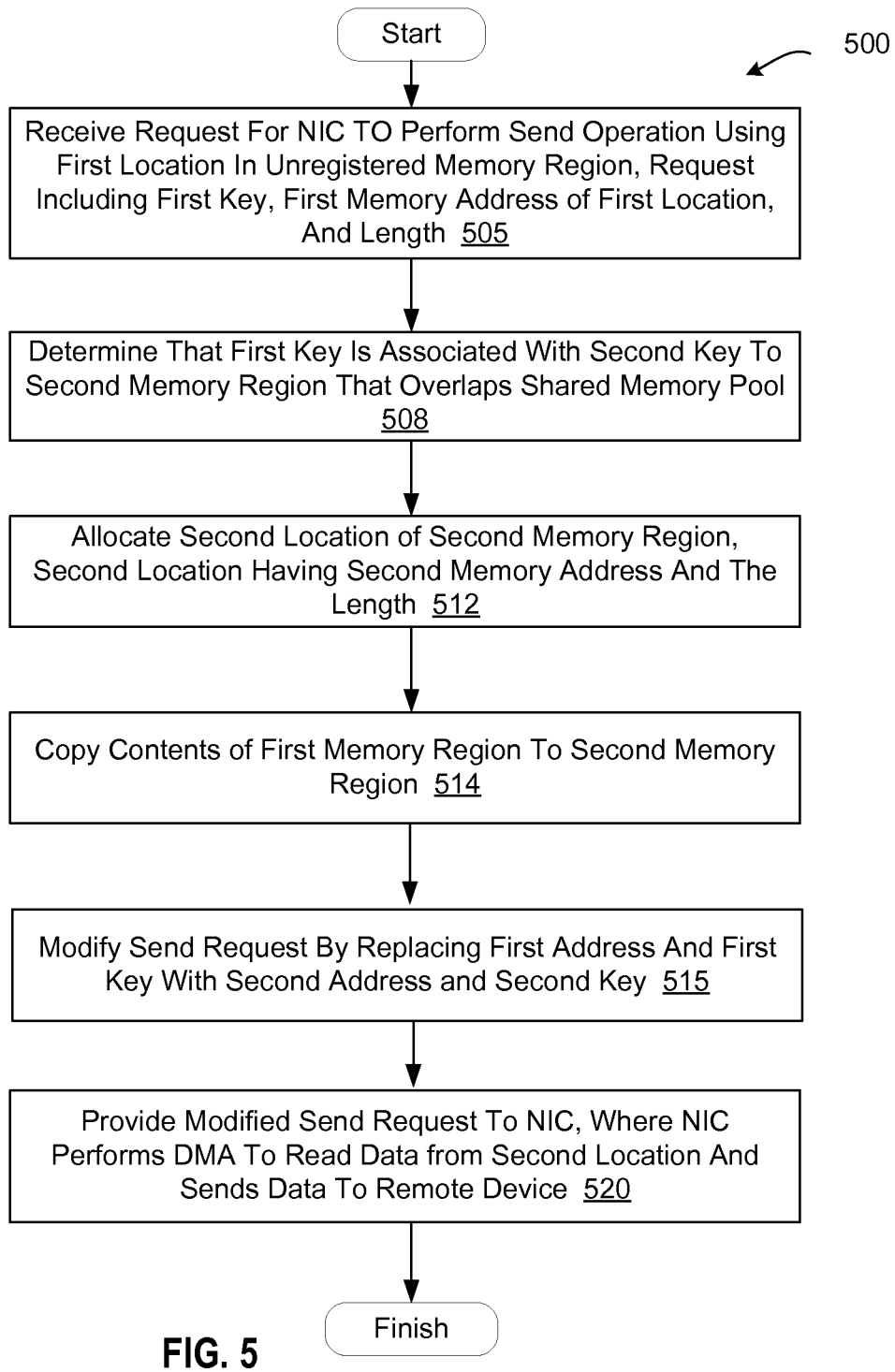
FIG. 5 is a flow diagram illustrating one embodiment of a method for using a shared memory pool for a send operation.
Figure 6:
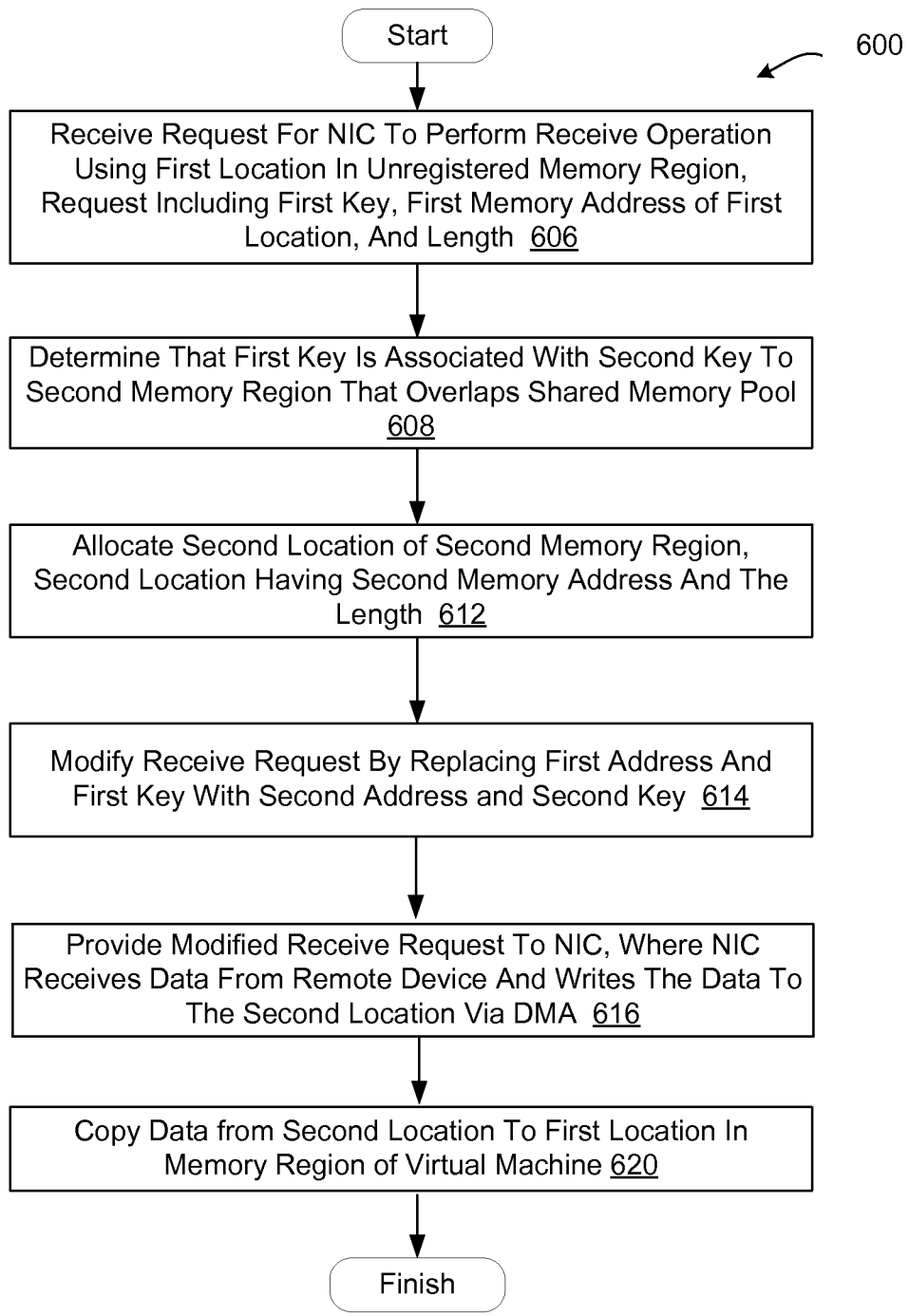
FIG. 6 is a flow diagram illustrating one embodiment of a method for using a shared memory pool for a receive operation.

FIGS. 4-6 are flow diagrams of various embodiments for setting up and using a shared memory pool for DMA operations. The methods are performed by processing logic that may include hardware (circuitry, dedicated logic, etc.), software (such as is run on a general purpose computer system or a dedicated machine), firmware, or some combination thereof. In one implementation, the methods may be performed by a shared pool manager 132 executing on a processing device 122 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

Referring to FIG. 4, a method 400 for setting up a shared memory pool for DMA operations is described. At block 405 of method 400, processing logic receives a request from a virtual machine to register a first memory region of the virtual machine with a hardware device. Such memory registration typically includes pinning memory pages of the memory region of the virtual machine and creating a key for the memory region, where the key is mapped to the physical memory to which the memory region is pinned.

At block 406, processing logic determines whether permissions for remotely initiated RDMA read requests and/or remotely initiated RDMA write requests are enabled in the request. If so, the method proceeds to block 409. Otherwise the method continues to block 408.

At block 409, processing logic disables memory overcommitment for the virtual machine. At block 410, processing logic registers the first memory region as requested.

At block 408, processing logic generates a virtual key for the unregistered first memory region. Since the memory region has not been registered, the virtual key does not map to any physical memory. At block 412, processing logic registers a second memory region controlled by a hypervisor (e.g., by a shared pool manager of the hypervisor) to the hardware device. The second memory region is or overlaps the shared memory pool. Processing logic may first create the second memory region before registering it. Registration of the second memory region may include generating a key for the second memory region 415 and pinning the second memory region to physical memory.

At block 420, processing logic generates a mapping of the first key to the second key. Alternatively or additionally, processing logic may generate a mapping of the first memory region to the second memory region.

At block 425, processing logic sends a response to the virtual machine that the first memory region is registered to the hardware device. The response may include the first key. Processing logic may also send a message including the second key to the hardware device.

Referring to FIG. 5, a method 500 for using a shared memory pool for a send operation is described. At block 505 of method 500, processing logic receives a send request which results in an operation to provide DMA access to a first location in an unregistered memory region. The request trigger an RDMA read request. The request may include a first memory address of a first location in the first memory region and a length of data to be read. The request may additionally include a key associated with the memory region.

At block 508, processing logic determines that the first key is a virtual key. Processing logic additionally determines that the first key is associated with a second key to a second memory region that overlaps a shared memory pool. The second memory region may be controlled by a hypervisor that manages the virtual machine.

At block 512, processing logic allocates a second location of the second memory region (shared memory pool) for the request. The second location has a second memory address and the length identified in the request. At block 514, processing logic copies contents of the first memory region to the second memory region (to the shared memory pool).

At block 515, processing logic modifies the send request by replacing the first address and the first key in the send request with the second address and the second key. At block 520, processing logic then provides the modified send request to a NIC or other hardware device. The NIC or other hardware device may then perform a DMA read operation to read data from the second location and send the data to a local device or remote device. Once the send request is satisfied, the allocated location in the second memory region (and the shared memory pool) may be deallocated so that the location in the shared memory pool can be reused by the virtual machine or by another virtual machine.

Referring to FIG. 6, a method 600 for using a shared memory pool for a receive operation is described. At block 605 of method 600, processing logic receives a receive request which results in an operation to provide DMA access to a first location in an unregistered memory region. The request may trigger an RDMA write request. The request may include a first memory address of a first location in the first memory region and a length of data to be written. The request may additionally include a key associated with the memory region.

At block 608, processing logic determines that the first key is a virtual key. Processing logic additionally determines that the first key is associated with a second key to a second memory region that overlaps a shared memory pool. The second memory region may be controlled by a hypervisor that manages the virtual machine.

At block 612, processing logic allocates a second location of the second memory region for the request. The second location has a second memory address and the length identified in the request.

At block 614, processing logic modifies the receive request by replacing the first address and the first key in the receive request with the second address and the second key. At block 616, processing logic then provides the modified receive request to a NIC or other hardware device. The NIC or other hardware device may then perform a DMA write operation to write data received from a local or remote device to the second location. At block 620, processing logic then performs a lookup to find the first location in the first memory region of the virtual machine, and copies the data from the second location to the first location in the first memory region of the virtual machine. Once the receive request is satisfied, the allocated location in the second memory region (and the shared memory pool) may be deallocated so that the location in the shared memory pool can be reused by the virtual machine or by another virtual machine.

Figure 7:
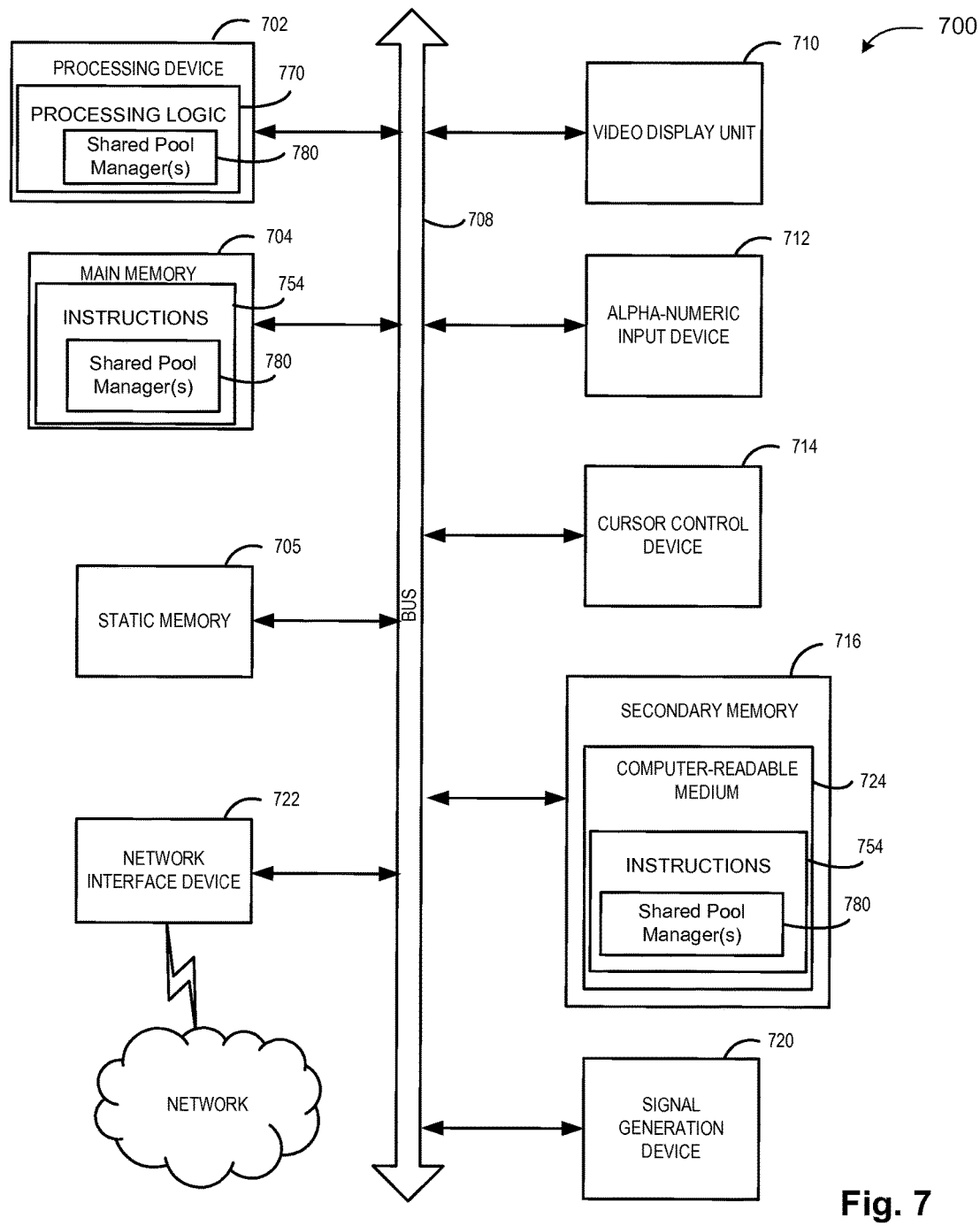
FIG. 7 illustrates a diagrammatic representation of a computing device, in accordance with embodiments.

FIG. 7 illustrates a diagrammatic representation of a machine in the exemplary form of a computer system 700 within which a set of instructions, for causing the machine to perform any one or more of the methodologies discussed herein, may be executed. The computer system 700 may correspond to computing device 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device), which communicate with each other via a bus 708.

The processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computer system 700 may further include a network interface device 722 (e.g., a network interface controller). The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions 754 embodying any one or more of the methodologies or functions described herein (e.g., shared pool managers 780). In one embodiment, shared pool managers 780 correspond to shared pool manager 190 of FIG. 1. The instructions 754 may also reside, completely or at least partially, within the main memory 704 and/or within the processing device 702 during execution thereof by the computer system 700; the main memory 704 and the processing device 702 also constituting machine-readable storage media.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The computer system 700 may additionally include memory management modules (not shown) for implementing the functionalities of the shared pool managers 780. The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components.

Some portions of the above described detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "generating", "determining", "sending", "mapping", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device executing a hypervisor, a first request from a virtual machine to register a memory region with a hardware device, wherein registering the memory region comprises pinning one or more underlying memory pages of the memory region and generating a key for the memory region;
   generating, by the processing device executing the hypervisor, a first key for the memory region, wherein the memory region is not registered with the hardware device;
   generating, by the processing device, a second key to access a shared memory pool, the shared memory pool being pinned and registered to the hardware device;
   generating a mapping of the first key to the second key;
   in response to generating the mapping of the first key to the second key, sending a response to the virtual machine that the memory region has been registered to the hardware device, the response comprising the first key that has been mapped to the second key, the first key comprising an indication that the first key is a virtual key that is to be replaced with the second key that is mapped to the first key;
   receiving a second request for the hardware device to perform an operation associated with the memory region, wherein the request identifies the first key; and
   copying data from a first memory location associated with the first key to a second memory location associated with the second key, wherein the operation is to be performed by the hardware device with the data at the second memory location.

2. The method of claim 1, further comprising:
   generating an additional memory region for the virtual machine, wherein the additional memory region is controlled by the hypervisor and overlaps the shared memory pool; and
   registering the additional memory region with the hardware device, wherein the second key for the shared memory pool comprises a key for the additional memory region that overlaps the shared memory pool.

3. The method of claim 2, wherein the virtual machine is associated with a protection domain, wherein the memory region is in the protection domain, and wherein the additional memory region is in the protection domain.

4. The method of claim 1, further comprising:
   determining whether permissions associated with the first request allow remote access to the memory region;
   responsive to determining that the permissions allow remote access to the virtual memory region, disabling overcommitment of virtual memory for the virtual machine; and
   responsive to determining that the permissions do not allow remote access to the memory region, proceeding with generating the first key.

5. The method of claim 1,
   wherein the hardware device is a network interface controller (NIC), the second request comprising the first key, a first memory address of the first location in the memory region and a length, and wherein the method further comprises:
   providing the hardware device with direct memory access (DMA) to the second location of the shared pool, the providing comprising:
   determining that the first key is associated with the second key in view of the indication that the first key is a virtual key;
   allocating the second location of the shared pool for the second request, the second location having the second memory address and the length;
   modifying the second request by replacing the first key and the first memory address in the second request with the second key and the second memory address; and
   sending the modified second request to the NIC.

6. The method of claim 5, wherein the second request is a send request, and
   wherein the NIC is to read the contents of the second memory region via DMA and send the contents from the second memory location to a remote device.

7. The method of claim 5, wherein the second request is a receive request, and wherein the NIC is to receive data from a remote device and write the data to the second location in the shared memory pool via DMA, the method further comprising:
   copying the data from the second location of the shared memory pool to the first location of the memory region of the virtual machine.

8. The method of claim 5, further comprising:
   determining that the operation associated with the second request has completed; and
   deallocating the second memory location of the shared memory pool.

9. The method of claim 5, further comprising:
   responsive to determining that there is insufficient available space in the shared memory pool to satisfy the second request, adding an entry into a queue for the second request; and
   performing the allocating of the second memory location responsive to the entry for the second request reaching a start of the queue and sufficient available space in the shared memory pool becoming available.

10. The method of claim 1, further comprising:
receiving a request to access the memory region, the request comprising a third key;
determining whether the third key corresponds to the second key; and
responsive to determining that the third key corresponds to the second key, returning an error.

11. A non-transitory computer readable storage medium comprising instructions that, when executed by a processing device executing a hypervisor, cause the processing device to:
receive, by the processing device executing the hypervisor, a first request from a virtual machine to register a memory region with a hardware device, wherein registering the memory region comprises pinning one or more underlying memory pages of the memory region and generating a key for the memory region;
generate, by the processing device executing the hypervisor, a first key for the memory region, wherein the memory region is not registered with the hardware device;
generate, by the processing device, a second key to access a shared memory pool, the shared memory pool being pinned and registered to the hardware device;
generate a mapping of the first key to the second key;
in response to generating the mapping of the first key to the second key, send a response to the virtual machine that the memory region has been registered to the hardware device, the response comprising the first key that has been mapped to the second key, the first key comprising an indication that the first key is a virtual key that is to be replaced with the second key that is mapped to the first key;
receive a second request for the hardware device to perform an operation associated with the memory region, wherein the request identifies the first key; and
copy data from a first memory location associated with the first key to a second memory location associated with the second key, wherein the operation is to be performed by the hardware device with the data at the second memory location.

12. The non-transitory computer readable storage medium of claim 11, wherein the instructions further cause the processing device to:
generate an additional memory region for the virtual machine, wherein the additional memory region is controlled by the hypervisor and overlaps the shared memory pool; and
register the additional memory region with the hardware device, wherein the second key for the shared memory pool comprises a key for the additional memory region that overlaps the shared memory pool.

13. The non-transitory computer readable storage medium of claim 12, wherein the virtual machine has a protection domain, wherein the memory region is in the protection domain, and wherein the additional memory region is in the protection domain.

14. The non-transitory computer readable storage medium of claim 11, wherein the instructions further cause the processing device to:
determine whether permissions associated with the first request allow remote access to the memory region;
responsive to determining that the permissions allow remote access to the virtual memory region, disable overcommitment of virtual memory for the virtual machine; and
responsive to determining that the permissions do not allow remote access to the memory region, proceed with generating the first key.

15. The non-transitory computer readable storage medium of claim 11,
wherein the hardware device is a network interface controller (NIC), the second request comprising the first key, the first memory address of a first location in the memory region and a length, and wherein the processing device is further to:
provide the hardware device with direct memory access (DMA) to the second location of the shared pool, wherein to provide the hardware device with the DMA, the processing device is further to:
determine that the first key is associated with the second key in view of the indication that the first key is a virtual key;
allocate the second location of the shared pool for the second request, the second location having the second memory address and the length;
modify the second request by replacing the first key and the first memory address in the second request with the second key and the second memory address; and
send the modified second request to the NIC.

16. The non-transitory computer readable storage medium of claim 15,
wherein the NIC is to read the contents of the second memory region via DMA and send the contents from the second memory location to a remote device.

17. The non-transitory computer readable storage medium of claim 15, wherein the second request is a receive request, and wherein the NIC is to receive data from a remote device and write the data to the second location in the shared memory pool via DMA, and wherein the instructions further cause the processing device to:
copy the data from the second location of the shared memory pool to the first location of the memory region of the virtual machine.

18. The non-transitory computer readable storage medium of claim 15, wherein the instructions further cause the processing device to:
determine that the operation associated with the second request has completed; and
deallocate the second memory location of the shared memory pool.

19. The non-transitory computer readable storage medium of claim 11, wherein the instructions further cause the processing device to:
responsive to determining that there is insufficient available space in the shared memory pool to satisfy the second request, add an entry into a queue for the second request; and
perform the allocating of the second memory location responsive to the entry for the second request reaching a start of the queue and sufficient available space in the shared memory pool becoming available.

20. A system comprising:
a memory;
a network interface controller (NIC) coupled to the memory; and
a processing device, operatively coupled with the memory and the NIC, the processing device to:

receive a first request from a virtual machine to register a memory region to the NIC, wherein registering the memory region comprises pinning one or more underlying memory pages of the memory region and generating a key for the memory region;

generate a first key for the memory region, wherein the memory region is not registered with the NIC;

generate a second key to access a shared memory pool, the shared memory pool being pinned and registered to the NIC;

generate a mapping of the first key to the second key;

in response to generating the mapping of the first key to the second key, send a response to the virtual machine that the memory region has been registered with the NIC, the response comprising the first key that has been mapped to the second key, the first key comprising an indication that the first key is a virtual key that is to be replaced with the second key that is mapped to the first key:

receive a second request for the NIC to perform an operation associated with the memory region, wherein the request identifies the first key; and copy data from a first memory location associated with the first key to a second memory location associated with the second key, wherein the operation is to be performed by the NIC with the data at the second memory location.

* * * * *